US008451383B2

(12) United States Patent
Shoji

(10) Patent No.: US 8,451,383 B2
(45) Date of Patent: May 28, 2013

(54) IMAGE DISPLAY DEVICE, IMAGE DISPLAY METHOD, AND IMAGE PROCESSING DEVICE

(75) Inventor: Takuro Shoji, Kanagawa (JP)

(73) Assignee: Sony Corporation, Tokyo (JP)

( * ) Notice: Subject to any disclaimer, the term of this patent is extended or adjusted under 35 U.S.C. 154(b) by 269 days.

(21) Appl. No.: 12/835,242

(22) Filed: Jul. 13, 2010

(65) Prior Publication Data

US 2011/0043704 A1  Feb. 24, 2011

(30) Foreign Application Priority Data

Aug. 24, 2009 (JP) ................. 2009-193252

(51) Int. Cl.
 *H04N 5/202* (2006.01)
 *G09G 5/10* (2006.01)
(52) U.S. Cl.
 USPC .......................................... 348/674; 345/690
(58) Field of Classification Search
 USPC .... 348/674–678, 254–256; 358/519; 345/690
 See application file for complete search history.

(56) References Cited

U.S. PATENT DOCUMENTS

| 2006/0164442 | A1 | 7/2006 | Furuhata et al. | |
|---|---|---|---|---|
| 2007/0046596 | A1* | 3/2007 | Sakakibara et al. | 345/87 |
| 2009/0295831 | A1* | 12/2009 | Yanagi | 345/643 |

FOREIGN PATENT DOCUMENTS

| CN | 1874527 | 12/2006 |
|---|---|---|
| EP | 0 947 955 A2 | 10/1999 |
| EP | 0 947 955 A3 | 10/1999 |
| EP | 1 752 958 A2 | 2/2007 |
| EP | 1 752 958 A3 | 2/2007 |
| JP | 2003-122336 | 4/2003 |
| JP | 2006-072361 | 3/2006 |
| JP | 2007-60393 | 3/2007 |
| JP | 2008-148055 | 6/2008 |

OTHER PUBLICATIONS

Search Report issued Oct. 21, 2010, in European Patent Application No. 10172896.2-2202.

* cited by examiner

*Primary Examiner* — Michael Lee
(74) *Attorney, Agent, or Firm* — Oblon, Spivak, McClelland, Maier & Neustadt, L.L.P.

(57) ABSTRACT

An image display device includes: an image projecting unit for externally performing enlargement projection of a main-image signal; a basic-property selecting unit for selecting a predetermined basic-gamma property from multiple basic-gamma properties of the main-image signal; a correction-property selecting unit for selecting a predetermined correction-gamma property from multiple correction-gamma properties of the main-image signal; a gamma-property calculating unit for calculating a gamma property for each signal level of the main-image signal based on the selected basic-gamma and correction-gamma properties; a gamma correcting unit for subjecting the main-image signal to gamma correction based on the calculated gamma property; an operating unit for outputting a first signal corresponding to a user's basic-gamma-property selection operation, and a second signal corresponding to a user's correction-gamma-property selection operation; and a control unit for controlling each of the selection operations of the predetermined basic-gamma and correction-gamma properties based on the first and second signals.

20 Claims, 9 Drawing Sheets

IMAGE DISPLAY DEVICE, IMAGE DISPLAY METHOD, AND IMAGE PROCESSING DEVICE

BACKGROUND OF THE INVENTION

1. Field of the Invention

The present invention relates to an image display device, an image display method, and an image processing device, whereby the image quality adjustment of a display image can be performed.

2. Description of the Related Art

In recent years, in-home movie viewing, business meeting presentations, and the like, have led to increased opportunities of image display devices such as projectors to be employed. Such image display devices include a function wherein the image quality adjustment of a display image is performed by operating means such as by remote control.

There is a gamma correction function for adjusting the brightness (luminance) of an image as one of image quality adjustment functions. This is a function for correcting a phenomenon wherein the brightness of a display image, and the original brightness of the image, differ due to the input/output property specific to the image display device. Therefore, heretofore, with an image display device such as a projector, various gamma correction techniques have been proposed (e.g., see Japanese Unexamined Patent Application Publication Nos. 2003-122336 and 2007-60393).

With Japanese Unexamined Patent Application Publication No. 2003-122336, in order to readily perform gamma correction of a predetermined portion on a display screen, a technique has been proposed wherein a pointer is displayed on the display screen, and the luminance of a portion selected by this pointer is adjusted.

Also, with Japanese Unexamined Patent Application Publication No. 2007-60393, in order to reduce time used for gamma correction, a technique has been proposed wherein the adjustment points of a plurality of gamma values (signal levels to perform gamma correction) are set on a gamma curve beforehand, and the difference of the input side gradation values between the adjustment points is set differently.

Also, besides the above techniques, for example, a technique has been proposed wherein gamma correction is performed by employing a personal computer connected to an image display device. Further, heretofore, a technique has also been proposed wherein gamma correction is performed by employing a gamma curve with a signal level interval (of which the data is thinned out) rougher than a display image.

SUMMARY OF THE INVENTION

As described above, heretofore, with an image display device such as a projector, various gamma correction techniques have been proposed. However, in the case that the gamma correction technique according to the related art is realized, for example, by an operation such as remote control, there has been a problem wherein the operation thereof is relatively inconvenient. Further, in the case that gamma correction is performed at an external device connected to an image display device, an operation such as installation of application software for gamma correction, or the like, is necessary, and accordingly, this has a problem wherein the operations become complicated, and instantaneousness suffers.

Also, for example, in the case that gamma correction is performed by employing a gamma correction technique such as proposed in Japanese Unexamined Patent Application Publication No. 2007-60393, or a gamma correction technique wherein a gamma curve of which the data is thinned out is used, this gamma correction is not performed for each signal level of a display image (in a full range). Accordingly, it has been difficult to reflect image quality that a user intends in the display image in a more accurate manner.

It has been found to be desirable to provide an image display device, an image display method, and an image processing device, whereby gamma correction according to a user's intents can be accurately and readily performed.

In order to solve the above problems, an image display device according an embodiment of the present invention is configured so as to include an image projecting unit, a basic property selecting unit, a correction property selecting unit, a gamma property calculating unit, an operating unit, and a control unit, and each of the units functions as follows. The image projecting unit externally carries out enlargement projection of an image corresponding to a main image signal. The basic property selecting unit selects the data of a predetermined basic gamma property from the data of a plurality of basic gamma properties having a mutually different property across the whole range of the signal level range of the main image signal. The correction property selecting unit selects the data of a predetermined correction gamma property from the data of a plurality of correction gamma properties having a mutually different property in a partial range within the signal level range of the main image signal. The gamma property calculating unit calculates the data of a gamma property for each signal level of the main image signal based on the data of the basic gamma property selected at the basic property selecting unit, and the data of the correction gamma property selected by the correction property selecting unit. The gamma correcting unit subjects the main image signal to gamma correction based on the data of the gamma property calculated at the gamma property calculating unit. The operating unit outputs a first signal corresponding to the selection operation of the data of the predetermined basic gamma property by a user, and a second signal corresponding to the selection operation of the data of the predetermined correction gamma property by a user. The control unit controls each of the selection operation of the data of the predetermined basic gamma property at the basic property selecting unit, and the selection operation of the data of the predetermined correction gamma property at the correction property selecting unit, based on a first signal and a second signal output from the operating unit.

Also, an image display method according to an embodiment of the present invention is performed in the following sequence. First, the data of a predetermined basic gamma property is selected from the data of a plurality of basic gamma properties having a mutually different property across the whole range of the signal level range of an image signal based on a signal corresponding to a user's first selection operation. Next, the data of a predetermined correction gamma property is selected from the data of a plurality of correction gamma properties having a mutually different property in a partial range within the signal level range of the image signal based on a signal corresponding to a user's second selection operation. Next, the data of a gamma property is calculated for each signal level of the image signal based on the data of the selected basic gamma property, and the data of the selected correction gamma property. Next, the image signal is subjected to gamma correction based on the data of the calculated gamma property. Subsequently, an image corresponding to the image signal subjected to the gamma correction is externally enlarged and projected.

Further, an image processing device according to an embodiment of the present invention is configured so as to include a basic property selecting unit, a correction property selecting unit, a gamma property calculating unit, an operating unit, and a control unit, and each of the units functions as follows. The basic property selecting unit selects the data of a predetermined basic gamma property from the data of a plurality of basic gamma properties having a mutually different property across the whole range of the signal level range of an image signal. The correction property selecting unit selects the data of a predetermined correction gamma property from the data of a plurality of correction gamma properties having a mutually different property in a partial range within the signal level range of the image signal. The gamma property calculating unit calculates the data of a gamma property for each signal level of the image signal based on the data of the basic gamma property selected at the basic property selecting unit, and the data of the correction gamma property selected by the correction property selecting unit. The gamma correcting unit subjects the image signal to gamma correction based on the data of the gamma property calculated at the gamma property calculating unit. The operating unit outputs a first signal corresponding to the selection operation of the data of the predetermined basic gamma property by a user, and a second signal corresponding to the selection operation of the data of the predetermined correction gamma property by a user. The control unit controls each of the selection operation of the data of the predetermined basic gamma property at the basic property selecting unit, and the selection operation of the data of the predetermined correction gamma property at the correction property selecting unit, based on the first signal and the second signal output from the operating unit. Note that "image" as used in the present Specification includes not only moving images but also still images.

With the above configuration, a user selects the data of a predetermined basic gamma property, and the data of a predetermined correction gamma property via the operating unit, and accordingly, based on these data, the data of a gamma property at the time of performing gamma correction as to the main image signal is calculated for each signal level.

With the configuration described above, the data of a gamma property at the time of performing gamma correction as to the main image signal is obtained, simply by a user selecting the data of a desired basic gamma property, and the data of a desired correction gamma property at the operating unit. Also, with the embodiment of the present invention, when the data of a gamma property is calculated based on the data of the selected basic gamma property and the data of the correction gamma property, the data of a gamma property is calculated for each signal level, i.e., in full range. Thus, according to the embodiment of the present invention, gamma correction according to a user's intent can be readily and accurately performed.

DESCRIPTION OF THE PREFERRED EMBODIMENTS

Figure 1:
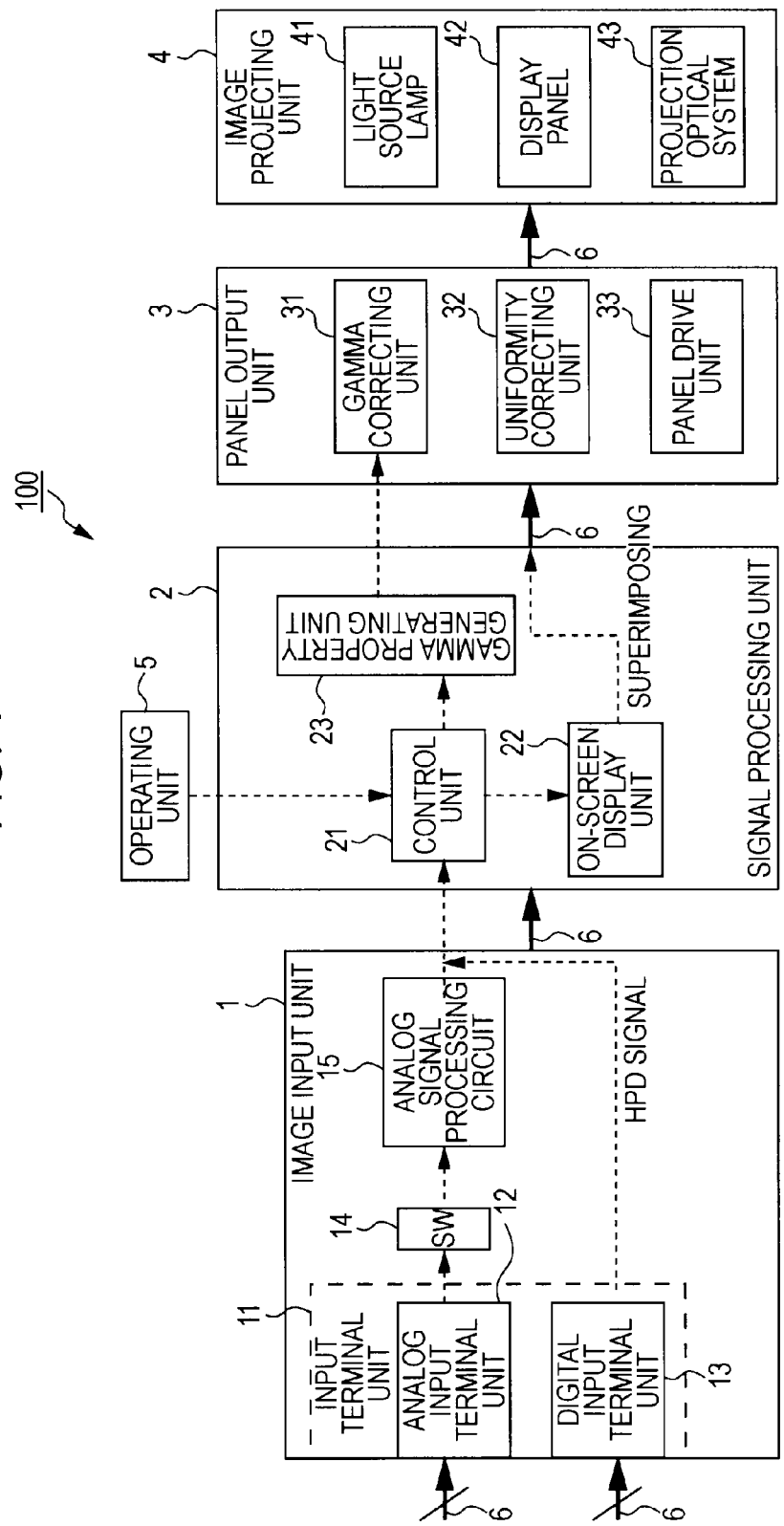
FIG. 1 is a schematic block configuration diagram of an image display device according to an embodiment of the present invention.

Configuration examples of an image display device according to an embodiment of the present invention will be described below in the following sequence with reference to the drawings. It should be noted that with the examples shown below, a projector will be exemplified as an image display device, but the present invention is not restricted to this.
1. Configuration of Image Display Device
2. Configuration of Gamma Property Generating Unit
3. Operation at the Time of Gamma Correction
4. Calculation Method of Gamma Property Data
5. Calculation Example of Gamma Property
1. Configuration of Image Display Device FIG. 1 illustrates the block configuration of an image display device (projector) according to an embodiment of the present invention. An image display device 100 according to the present embodiment includes an image input unit 1, a signal processing unit 2, a panel output unit 3, an image projecting unit 4, and an operating unit 5. The image input unit 1, signal processing unit 2, panel output unit 3, and image projecting unit 4 are electrically connected from the input side of an image signal 6 (main image signal) in this sequence. Also, the operating unit 5 is connected to a later-described control unit 21 within the signal processing unit 2.

Now, in order to simplify description, the configuration of the processing line of the image signal 6 within the image input unit 1 and signal processing unit 2 in FIG. 1 is omitted, and with the image input unit 1, only components used for input status determining processing of the image signal 6 are illustrated. Also, with the signal processing unit 2, only components used for gamma property correction processing, and correction menu display processing are illustrated. Note that the input status determining processing of the image signal 6 at the image input unit 1, and the gamma property correction processing at the signal processing unit 2 are performed with the background of the processing of the image signal 6. Also, with the present embodiment, the configuration on the processing line of the image signal 6 can be configured in the same way as with the configuration of a projector according to the related art.

The image input unit 1 includes an input terminal unit 11, a terminal switching unit 14, and an analog signal processing circuit 15. The input terminal unit 11 includes an analog input terminal unit 12 configured of multiple input terminals for analog signals, and a digital input terminal unit 13 configured of multiple input terminals for digital signals.

The analog input terminal unit 12 is configured of multiple input terminals for different-type analog signals. The analog input terminal unit 12 may be configured of an input terminal for composite video signals (video signals), an input terminal for S (Separate)-video signals, a D-sub (D-subminiature) terminal, an input terminal for component video signals, and so forth.

Also, the digital input terminal unit 13 may be configured of an input terminal for digital signals conforming to the HDMI (High-Definition Multimedia Interface) standard, or the like. Note that, with the present embodiment, the applied voltage (5V) signal of each HDMI terminal (hereafter, referred to as "HPD signal") obtained by a hot plug detect function as to digital signals, is employed as an identification signal at the time of determining the input status of the image signal 6. Subsequently, the detected HPD signal is output to the control unit 21 within the signal processing unit 2.

The terminal switching unit 14 is configured of selection means such as a switch, and selects a desired input terminal from the input terminal group of the analog input terminal unit 12. Subsequently, the output terminal of the terminal switching unit 14 is connected to the input terminal of the analog signal processing circuit 15. Note that the terminal switching unit 14 is a switching unit used for determining the input status of the image signal 6, and a switching unit for switching a main image to be projected is provided separately on the processing line of the image signal 6.

The analog signal processing circuit 15 detects parameters of the image signal 6 to be input via the input terminal selected at the terminal switching unit 14 such as HV (Horizontal Vertical) synchronizing frequency, the type of a synchronizing signal, and the polarity of a synchronizing signal. These detected parameters differ depending on the type of the image signal 6 to be input. Therefore, with the present embodiment, the signals corresponding to these parameters are employed as input status identification signals as to analog signals. Subsequently, the analog signal processing circuit 15 outputs the identification signals corresponding to the detected parameters to the control unit 21 within the signal processing unit 2.

Also, though not illustrated in FIG. 1, the image input unit 1 includes on the image signal 6 processing line, in the same way as with the projector according to the related art, for example, a chroma conversion unit for converting the chroma format of an input video signal, and an HDMI receiver for receiving an HDMI signal.

The signal processing unit 2 includes the control unit 21, an on-screen display unit 22 (gamma correction information display unit), and a gamma property generating unit 23.

The control unit 21, which is configured of an arithmetic control device, such as a CPU (Central Processing Unit), controls the processing and operation of each unit of the image display device 100. For example, the control unit 21 controls the operation of gamma property generation processing of the gamma property generating unit 23. Further, the control unit 21 controls, for example, input terminal switching operation at the terminal switching unit 14 within the image input unit 1, and input status determination processing of the image signal 6. Note that the control of the input status determination processing of the image signal 6 is performed based on the identification signal and HPD signal to be output from the image input unit 1.

The on-screen display unit 22 generates a GUI (Graphical User Interface) image (hereafter, referred to as "pallet") indicating a menu (selection candidate information) when the user performing operations of display image (input terminal) selection, image quality adjustment, or the like using the operating unit 5, for example. Subsequently, the on-screen display unit 22 (hereafter, referred to as OSD (On Screen Display) unit) superimposes the image signal (sub image signal) corresponding to the generated pallet on the image signal (main image signal) corresponding to the main image now being projected.

Note that, with the present embodiment, the control unit 21 includes a determining unit (not shown) configured to perform the input status determination processing of the image signal 6 based on the identification signal and HPD signal of the image signal 6 to be input from the image input unit 1. Subsequently, the OSD unit 22 displays the GUI pallet which displays the information of an input terminal as the user's selection candidate information by superimposing the GUI pallet on the main image, based on the determination results at the determining unit. At this time, with the present embodiment, an arrangement is made wherein only the information of an input terminal to which the main image signal now being input as the selection candidate information thereof is displayed. Thus, the user can more readily recognize what kind of external device is currently connected to the image display device 100.

The gamma property generating unit 23 generates the data of a gamma property to be used at the time of performing gamma correction as to the input image signal 6. The internal configuration and function of the gamma property generating unit 23 will be described in detail later.

Also, though not illustrated in FIG. 1, the signal processing unit 2 has, in the same way as with the projector according to the related art, a function for subjecting the image signal 6 to predetermined processing, on the processing line of the image signal 6. For example, the signal processing unit 2 includes an IP (Interlace Progressive) conversion unit configured to convert an interlace image into a progressive image, an image size conversion unit configured to change image dimensions, and an image adjustment unit configured to adjust the color of an image or the like.

The panel output unit 3 performs predetermined image processing as to the image signal 6 output from the signal processing unit 2, and outputs the processed image signal 6 to the image projecting unit 4. The panel output unit 3, which may be configured in the same way as that of the projector according to the related art, includes a gamma correcting unit 31, a uniformity correcting unit 32, and a panel drive unit 33.

The gamma correcting unit 31 corrects the gamma value of the input image signal 6 so as to be adapted to the gamma property of a later-described display panel 42 within the image projecting unit 4. Note that, in the case that the user has performed adjustment of the gamma value via the operating unit 5, the gamma correcting unit 31 sets the gamma value of the image signal 6 based on the data of the gamma property to be output from the gamma property generating unit 23. Also, in the case that the user has not performed adjustment of the gamma value via the operating unit 5, the gamma correcting unit 31 performs no gamma correction, or performs gamma correction using a predetermined set gamma value (property).

Also, the uniformity correcting unit 32 reduces display unevenness on the screen of the display panel 42. Further, the panel drive unit 33 carries out driving control of the later-described display panel 42 within the image projecting unit 4.

The image projecting unit 4 optically processes the flux of light emitted from a light source to form image light based on the image signal 6 output from the panel output unit 3, and externally carries out enlargement projection of the image light thereof to a screen or the like. The image projecting unit 4, which may be configured in the same way as that of the projector according to the related art, includes the light source lamp 41, display panel 42, and projection optical system 43.

The light source lamp 41 may be configured of a discharge luminescent light source lamp such as an extra-high pressure mercury lamp, a metal halide lamp, or a xenon lamp. Also, a solid-state light emitting element such as a light emitting diode, a laser diode, an induction EL (Electro Luminescence) element, or a silicon light emitting device may be employed as the light source lamp 41.

The display panel 42 may be configured of a transmissive LCD (Liquid Crystal Display) panel or the like. With such a display panel 42, the emitted light from the light source lamp 41 is transmitted or shielded in increments of liquid cells by changing the array of liquid crystal molecules sealed in a liquid cell (not shown) based on the driving signal from the panel drive unit 33. As a result thereof, the image light corresponding to the driving signal from the panel drive unit 33 is emitted from the display panel 42 to the projection optical system 43.

Note that a liquid crystal panel of an arbitrary method may be employed as the display panel 42. For example, a reflective liquid crystal display panel, or an LCOS (Liquid Crystal On Silicon) panel may be employed. Also, for example, a driving circuit built-in liquid crystal panel, or a liquid crystal panel to which a driving circuit is externally attached may be employed as the display panel 42. Further, for example, a liquid crystal panel such as a simple matrix method, TFD (Thin Film Diode) active matrix method, passive matrix method, rotatory-polarization mode method, or double refraction mode method may be employed as the display panel 42.

The projection optical system 43 externally carries out enlargement projection of the image light emitted from the display panel 42 toward a screen or the like. Note that the same as the projection optical system employed at the projector according to the related art may be employed as the projection optical system 43.

The operating unit 5 may be configured of, for example, a remote controller including buttons and keys, or buttons and keys of an operation panel provided to the image display device 100 itself. With the operating unit 5, all of the operations of the image display device 100 may be performed, such as an on/off operation of the image display device 100, image quality adjustment operations of a projective image, volume adjustment operations, the display operations of an input pallet, and switching and selection operations of an input terminal. Note that the operating unit 5 is connected to the control unit 21 within the signal processing unit 2, and when the user performs a predetermined operation at the operating unit 5, the operation signal corresponding to the operation thereof is output to the control unit 21, and the predetermined operation is carried out.

2. Configuration of Gamma Property Generating Unit

Figure 2:
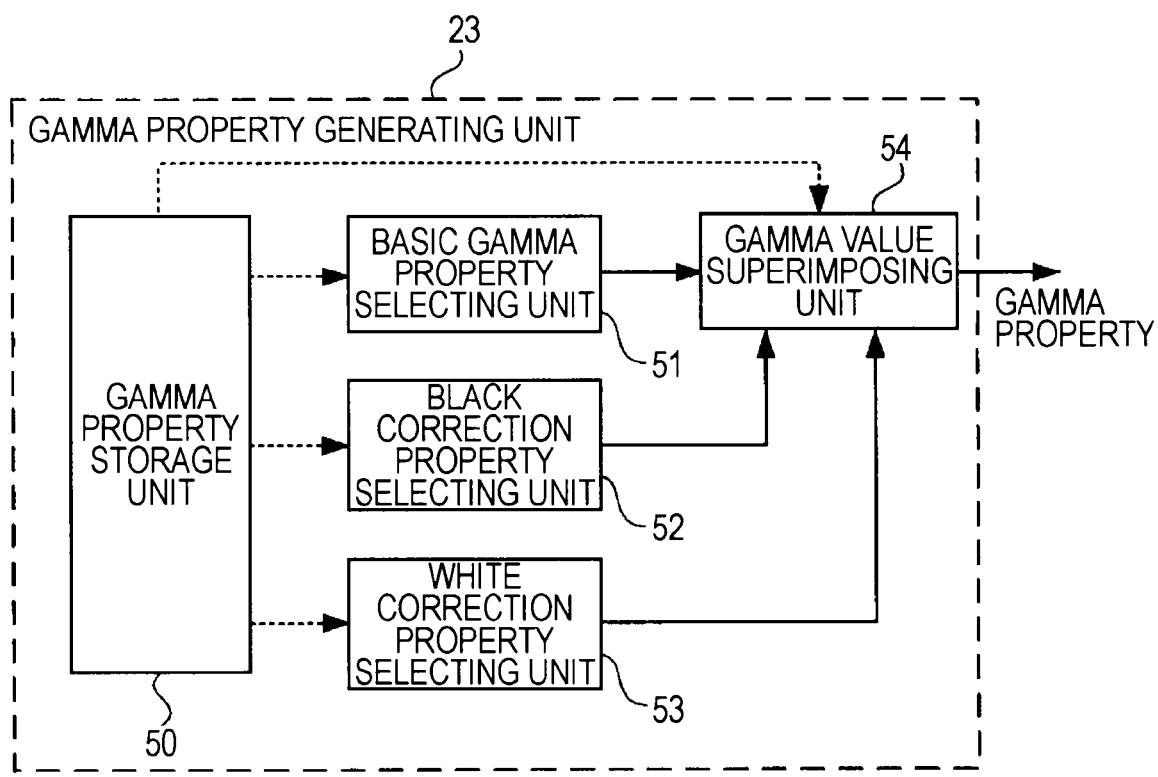
FIG. 2 is a schematic block configuration diagram of a gamma property generating unit.

Next, the configuration of the gamma property generating unit 23 will be described. FIG. 2 illustrates the schematic internal configuration of the gamma property generating unit 23.

The gamma property generating unit 23 includes a gamma property storage unit 50, a basic gamma property selecting unit 51, a black correction property selecting unit 52, a white correction property selecting unit 53, and a gamma value superimposing unit 54.

The gamma property storage unit 50 (storage unit) is configured of ROM (Read Only Memory) or the like. The data of a plurality of basic gamma properties having a mutually different property across the whole region of the signal level range of the image signal 6 is stored in the gamma property storage unit 50.

With the present embodiment, various basic multiplier gamma curves such as a gamma curve of the 1.8th power, or a gamma curve of the 2.2th power, and the data of a linear gamma property are prepared as the data of a plurality of basic gamma properties. Also, with the present embodiment, the data of a great number of various deformation gamma properties other than basic multiple gamma curves and a linear gamma property is prepared. For example, data such as a gamma curve for displaying the same video as video shown in a movie theater (hereafter, referred to as "gamma curve for films") is prepared as the data of a deformation gamma property. Note that a gamma curve for films is an S-character-shaped gamma curve so that the gamma value thereof is low in a low-luminance region (black region), and is high in a high-luminance region (white region). Therefore, when this gamma curve for films is employed, sharp video is obtained wherein the contrast is relatively high, such as video to be shown in a movie theater.

Also, the data of a gamma property recommended by an external device to be connected to the image display device 100 may be prepared as the data of a deformation gamma property. Further, the data of a gamma property set according to the type of a display image (e.g., color, monochrome, still image, moving image, or the like) as appropriate may be prepared as the data of a deformation gamma property. Note that the type and number of gamma properties prepared beforehand may be set according to usage, the type of displayable image, and so forth as appropriate.

Further, with the present embodiment, the data of a plurality of black correction properties (first correction gamma properties) of which the gamma values can be corrected to both of positive and negative values in a low-luminance region (hereafter, referred to as "black region") in a stepwise manner is prepared, and the data thereof is stored in the gamma property storage unit 50. Note that the black region may be set to a signal level of 0 through 25 [IRE], for example. However, the present invention is not restricted to this, and the upper-limit value of the black region (first signal level) may be set according to usage or the like as appropriate. Note that the unit IRE (Institute of Radio Engineers) is a signal level unit when the white level is 100%.

Also, with the present embodiment, the data of a plurality of white correction properties (second correction gamma properties) of which the gamma values can be corrected to both of positive and negative values in a high-luminance region (hereafter, referred to as "white region") in a stepwise manner is prepared, and the data thereof is stored in the gamma property storage unit 50. Note that the white region may be set to a signal level of 75 through 100 [IRE], for example. However, the present invention is not restricted to this, and the lower-limit value of the white region (second signal level) may be set according to usage or the like as appropriate.

Note that, with the present embodiment, each gamma value of the lower-limit and upper-limit signal levels of each correction property (black correction property and white correction property) is set so as to be matched to the gamma value of the basic gamma property. Also, the number of steps correctable of each correction property, and the correction amount of a gamma value per one step may be set according to usage or the like as appropriate.

Also, with the present embodiment, the data length of each correction property to be prepared is set to the same as the number of all of the signal levels of the image signal 6. However, the data corresponding to the correction amount of a predetermined gamma value is recorded in the data region corresponding to a correction region within the data of a correction property, and data to set the correction amount to zero is recorded in other data regions. Note that the data length of each correction property is not restricted to this, and in the event that the data length is equal to or greater than the number of signal levels of each correction region (black region and white region), may be set arbitrarily. For example, the data length of each correction property may be set to the same as the number of signal levels of each correction region (black region and white region).

Further, with the present embodiment, such as described later, when the gamma value superimposing unit 54 calculates a gamma property, the data of a gamma property for calibration is employed, but this data is also stored in the gamma property storage unit 50.

Also, the gamma property storage unit 50 is connected to each unit within the gamma property generating unit 23, and at the time of operation of each unit, each unit reads out data to be used from the gamma property storage unit 50, and uses this.

The basic gamma property selecting unit 51 (basic property selecting unit) reads out (selects) the data corresponding to the basic gamma property that the user selected via the operating unit 5 at the time of gamma correction, from the gamma property storage unit 50. Also, the output terminal of the basic gamma property selecting unit 51 is connected to the gamma value superimposing unit 54, and the basic gamma property selecting unit 51 outputs the data of the basic property read out from the gamma property storage unit 50 to the gamma value superimposing unit 54.

The black correction property selecting unit 52 (first correction property selecting unit) reads out (selects) the data corresponding to the black correction property that the user selected via the operating unit 5 at the time of gamma correction, from the gamma property storage unit 50. Also, the output terminal of the black correction property selecting unit 52 is connected to the gamma value superimposing unit 54, and the black correction property selecting unit 52 outputs the data of the black correction property read out from the gamma property storage unit 50 to the gamma value superimposing unit 54.

The white correction property selecting unit 53 (second correction property selecting unit) reads out (selects) the data corresponding to the white correction property that the user selected via the operating unit 5 at the time of gamma correction, from the gamma property storage unit 50. Also, the output terminal of the white correction property selecting unit 53 is connected to the gamma value superimposing unit 54, and the white correction property selecting unit 53 outputs the data of the white correction property read out from the gamma property storage unit 50 to the gamma value superimposing unit 54.

The gamma value superimposing unit 54 (gamma property calculating unit) superimposes the data of the input basic gamma property, the data of the black correction property and/or the data of the white correction property to calculate the data of a desired gamma property. Note that, with the present embodiment, superimposing processing of each data at the gamma value superimposing unit 54 is performed for each signal level of the image signal 6. That is to say, with the present embodiment, the basic gamma property is corrected in a full range to calculate the data of a desired gamma property.

However, in the case that the user does not perform correction of the gamma values in both of the black region and the white region, the gamma value superimposing unit 54 outputs the data of the basic gamma property as the data of the final gamma property. Also, in the case that the user performs correction of the gamma value of one of the black region and the white region, the gamma value superimposing unit 54 superimposes one of the data of the black correction property and the data of the white correction property on the data of the basic gamma property. Further, in the case that correction of the gamma values is performed in both of the black region and the white region, the gamma value superimposing unit 54 superimposes both of the data of the black correction property and the data of the white correction property on the data of the basic gamma property. Note that a specific calculation technique of gamma properties at the gamma value superimposing unit 54 will be described in detail later.

Note that, with the present embodiment, an example has been described wherein the gamma property storage unit 50 which stores the data of a basic gamma property prepared beforehand, black correction property, and/or white correction property is provided separately from each of other units within the gamma property generating unit 23, but the present invention is not restricted to this.

An arrangement may be made wherein each of the basic gamma property selecting unit 51, black correction property selecting unit 52, white correction property selecting unit 53, and gamma value superimposing unit 54 includes a storage unit, and predetermined data is store in each of the storage units. In this case, the data of a plurality of basic gamma properties is stored in the storage unit of the basic gamma property selecting unit 51, and the data of a plurality of black correction properties and a plurality of white correction properties is stored in the storage units of the black correction property selecting unit 52 and the white correction property selecting unit 53 respectively. Further, data to be used for calculation of gamma properties (e.g., gamma properties for calibration, and the like) is stored in the storage unit of the gamma value superimposing unit 54.

Also, with the present embodiment, an arrangement may be made wherein the gamma property generating unit 23 reads out data to be used from a storage medium such as an HDD (Hard Disk Drive), semiconductor memory, or optical disc in which the above various types of data are stored.

Figure 3:
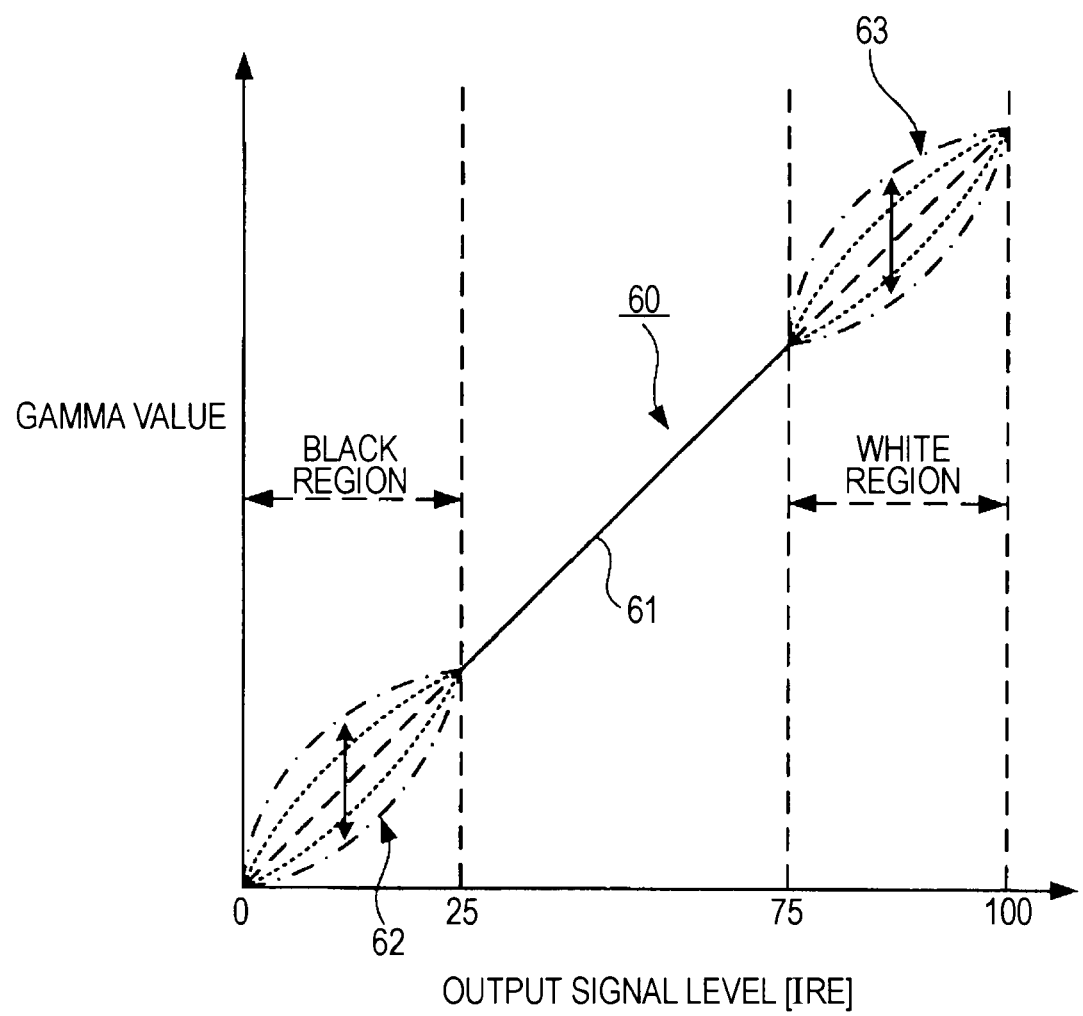
FIG. 3 is a diagram illustrating the outline of gamma correction.

Now, FIG. 3 illustrates the outline of gamma properties to be calculated at the gamma value superimposing unit 54 according to the present embodiment. Note that the horizontal axis in FIG. 3 represents an output signal level, and the vertical axis represents a gamma value after correction. With the example illustrated in FIG. 3, let us say that a basic gamma property 61 is taken as a linear gamma property, the black region is taken as a signal level range of 0 through 25 [IRE], and the white region is taken as a signal level range of 75 through 100 [IRE].

With the example illustrated in FIG. 3, in the case that the user does not perform correction of the gamma values in both of the black region and the white region, correction gamma properties 62 and 63 of the black region and the white region become straight lines (dashed lines within the black region and the white region) in the same way as with the basic gamma property 61. Therefore, in this case, the data of a linear gamma property 60 is output from the gamma value superimposing unit 54.

Also, with the example illustrated in FIG. 3, in the case that the user corrected the gamma value of the black region, the correction gamma property 62 of the black region becomes a curve shifted vertically as to the basic gamma property 61 by the correction amount worth corresponding to the correction step selected by the user (see the dotted line and dashed-dotted line in FIG. 3). That is to say, in this case, a gamma property 60 is obtained wherein the gamma property of the black region becomes a curve, and the gamma properties in other signal level regions become a straight line. At this time, in the case that the user performed correction in a direction where the gamma value is increased in the black region, the gradient of a black region portion (dark portion) of a display image can be increased. Conversely, in the case that the user performed correction in a direction where the gamma value is decreased in the black region, the display image becomes an image of which the dark portion is blacked out, and accordingly, the sharp image of which the contrast is high is obtained.

Also, with the example illustrated in FIG. 3, in the case that the user corrected the gamma value of the white region, the correction gamma property 63 of the white region becomes a curve shifted vertically as to the basic gamma property 61 by the correction amount worth corresponding to the correction step selected by the user (see the dotted line and dashed-dotted line in FIG. 3). That is to say, in this case, a gamma property 60 is obtained wherein the gamma property of the white region becomes a curve, and the gamma properties in other signal level regions become a straight line. At this time, in the case that the user performed correction in a direction where the gamma value is increased in the white region, a white region portion (bright portion) of a display image further becomes bright, and accordingly, the bright portion becomes a state called as "whiteout", and the image of which the contrast is high is obtained. Conversely, in the case that the user performed correction in a direction where the gamma value is decreased in the white region, the gradient of the bright portion can be increased.

Further, with the example illustrated in FIG. 3, in the case that the user corrected the gamma values in both of the black region and the white region, the correction gamma properties 62 and 63 of both regions become a curve vertically shifted from the basic gamma property 61 by the correction amount corresponding to the correction step selected of each correction region by the user. That is to say, in this case, a gamma property 60 is obtained wherein both regions of the black region and the white region become a curve, and the gamma properties in other signal level regions become a straight line.

Note that, with the present embodiment, an example has been described wherein the gamma values are corrected in both of the low-luminance region (black region) and the high-luminance region (white region), but the present invention is not restricted to this. For example, correction of a gamma value may be performed in an intermediate-luminance (density) region according to usage, and the user's preference. In this case, an arrangement may be configured in the same way as with the above embodiment except that a signal level region to be corrected is set to an intermediate-luminance region.

However, in general, as for the user who uses a gamma value correction function, a region of which the correction frequency is high is the low-luminance region and the high-luminance region. Also, even when correcting the gamma value of an intermediate-luminance region, great change (effects) such as contrast or gradation for example of an image is not obtained. Therefore, in the case of taking these into consideration, such as the present embodiment, it is desirable to make an arrangement wherein the gamma values are corrected in both of the low-luminance region (black region) and the high-luminance region (white region).

3. Operation at the Time of Gamma Correction

Next, a series of processing procedures from the calculation operation of a gamma property to the display operation of the image signal 6 of the image display device 100 according to the present embodiment will be described with reference to FIGS. 4 through 8.

Figure 4:
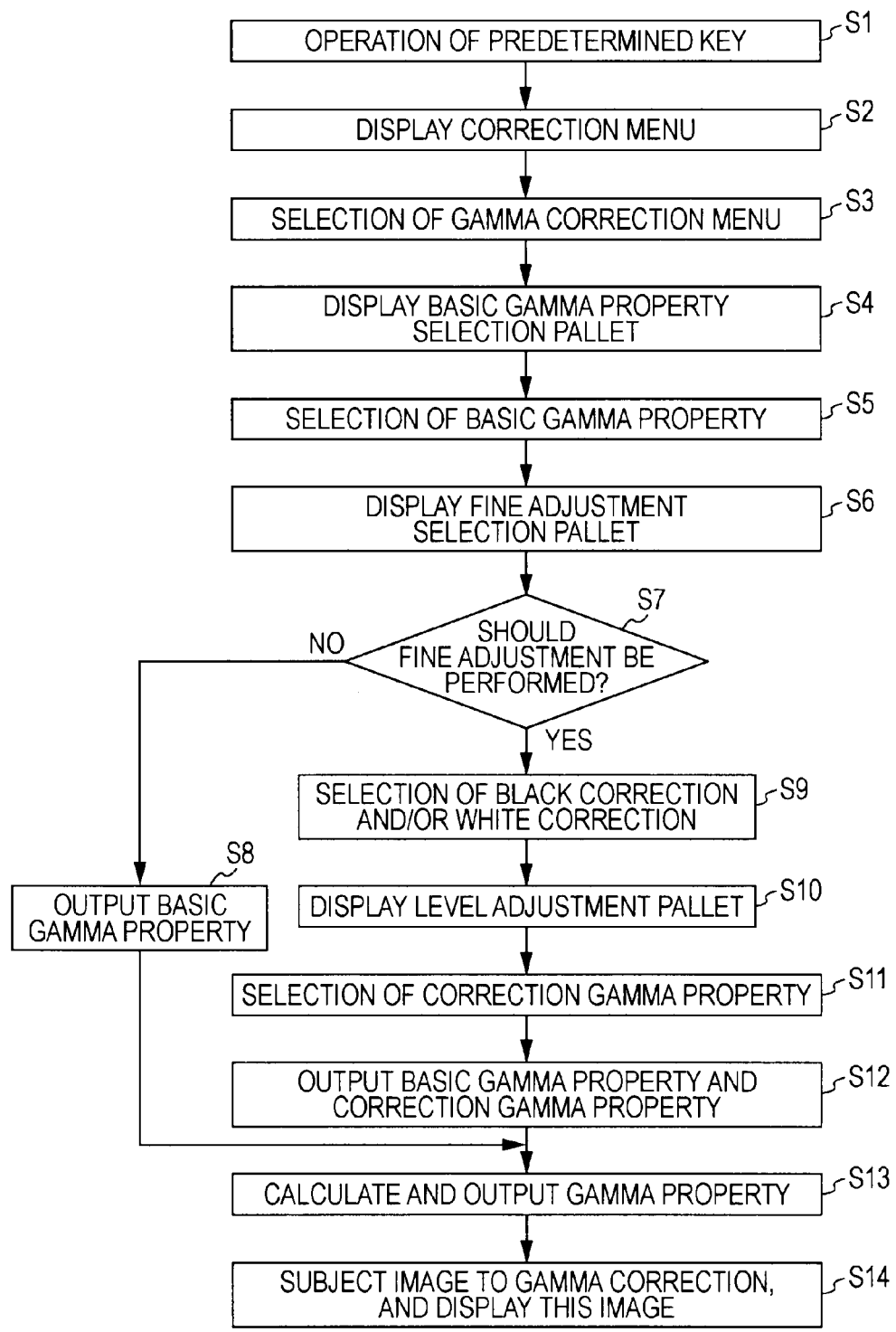
FIG. 4 is a flowchart illustrating the procedures of image display operation of an image display device according to an embodiment of the present invention.

Note that FIG. 4 is a flowchart illustrating a series of operation procedures from the calculation operation of a gamma property to the display operation of the image signal 6. Also, FIGS. 5 through 8 are display examples of a GUI pallet to be displayed on a display image at the time of each processing step illustrated in FIG. 4. Note that the pallets described in FIGS. 5 through 8 are displayed by the image signal (sub image signal) corresponding to a GUI pallet generated by the OSD unit 22 being superimposed on the image signal (main image signal) corresponding to a main image now being projected.

First, the user performs an operation to the effect that the image quality adjustment menu (image correction selection pallet) of a display image (main image) is displayed, for example, by using a predetermined key (e.g., "menu" key) of the operating unit 5 (step S1). Thus, the operating unit 5 outputs the operation signal corresponding to the operation thereof to the control unit 21 within the signal processing unit 2.

Next, the control unit 21 causes the OSD unit 22 to operate based on the input operation signal. Subsequently, the OSD unit 22 displays an image correction selection pallet on a main image (step S2).

Figure 5:
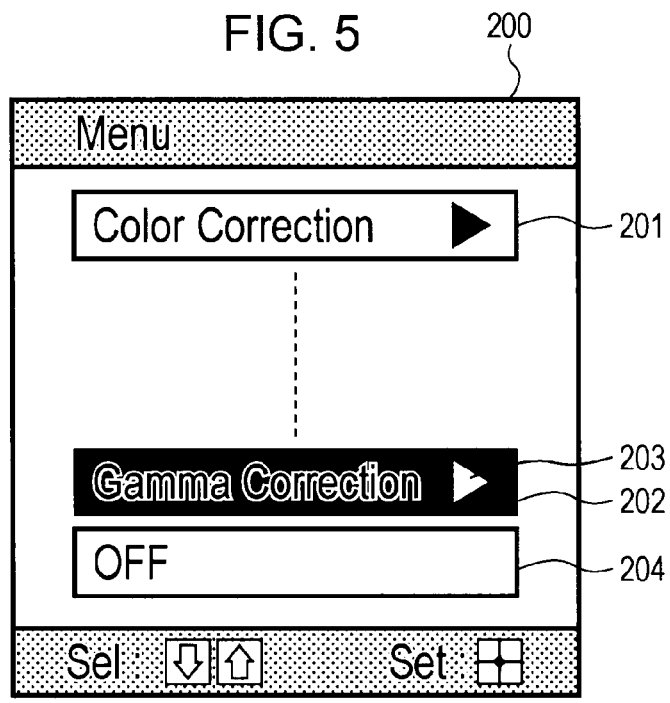
FIG. 5 is a display example of an image correction selection pallet.

FIG. 5 illustrates a display example of the image correction selection pallet to be displayed on the main image in step S2. With an image correction selection pallet 200, selection blocks corresponding to various image quality adjustment operations that can be performed at the image display device 100 according to the present embodiment are listed. Note that, at this time, the image correction selection pallet 200 is displayed partially above the main image, but the display position thereof may arbitrarily be set.

With the example illustrated in FIG. 5, a selection block 201 displayed as "Color Correction" within the image correction selection pallet 200 is the selection block of a color correction menu. Also, a selection block 202 displayed as "Gamma Correction" within the image correction selection pallet 200 is the selection block of a gamma value correction menu. Note that a triangular display button 203 described in the selection blocks 201 and 202 indicates that each selection block further includes a block of a low-level selection menu. Also, a selection block 204 displayed as "OFF" within the image correction selection pallet 200 is a block to be selected when halting implementation of image correction.

Note that, with the image correction selection pallet 200, selection blocks corresponding to all of the image quality adjustment operations available at the image display device 100 may be displayed, only a part of the selection blocks may be displayed according to the type of a main image (e.g., color, monochrome, still image, or moving image), or the like.

Also, "↑" and "↓" displayed in the field of "Sel" of the lower edge within the image correction selection pallet 200 illustrated in FIG. 5 correspond to a selection key at the time of switching a selection block at the operating unit 5. Also, a cross-shaped symbol displayed in the field of "Set" of the lower edge within the image correction selection pallet 200 corresponds to a determination button of the operating unit 5.

Further, with the image correction selection pallet 200 illustrated in FIG. 5, the color of the selection block, and the color of characters within the selection block, corresponding to the correction menu selected by the user are displayed in an inverted manner as to unselected selection blocks.

Such as described above, after the image correction selection pallet 200 is displayed on the main image, the user uses the operating unit 5 to select the selection block 202 displayed as "Gamma Correction" within the image correction selection pallet 200 (step S3: first selection operation). Thus, the operating unit 5 outputs the operation signal corresponding to the operation thereof (first signal) to the control unit 21 within the signal processing unit 2. Also, at this time, the OSD unit 22 displays, such as illustrated in FIG. 5, the color of the selection block 202, and the color of characters within the block in an inverted manner.

Next, the control unit 21 outputs a command signal to the effect that a basic gamma property selection pallet is to be displayed based on the operation signal output from the operating unit 5, to the OSD unit 22. Subsequently, the OSD unit 22 displays the basic gamma property selection pallet on the main image based on the input command signal (step S4).

Figure 6:
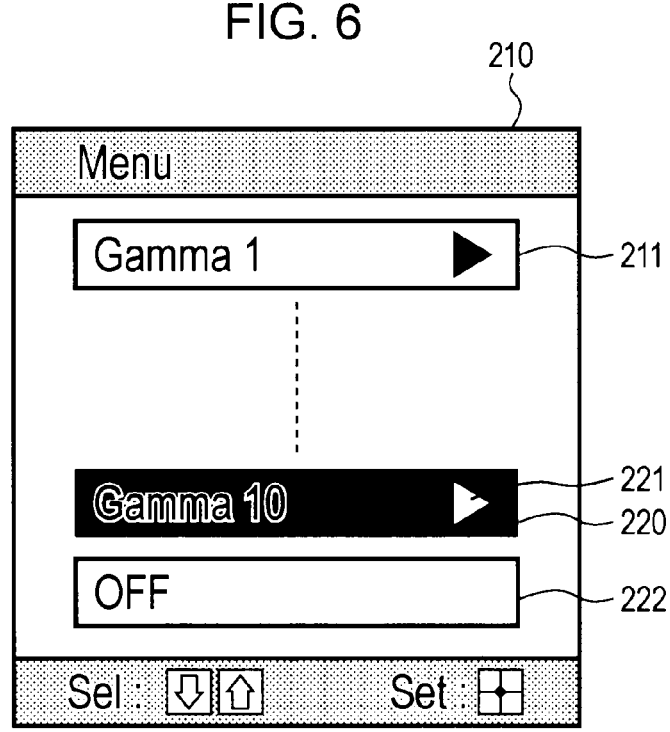
FIG. 6 is a display example of a basic gamma property selection pallet.

FIG. 6 illustrates a display example of the basic gamma property selection pallet to be displayed on the main image in step S4. With the basic gamma property selection pallet 210, the selection blocks corresponding to the data of various basic gamma correction properties stored in the gamma property storage unit 50 are listed, respectively. Note that the basic gamma property selection pallet 210 may be displayed by redrawing the image correction selection pallet 200 illustrated in FIG. 5, or the basic gamma property selection pallet 210 may be displayed from the image correction selection pallet 200 in a pop-up manner. Further, the basic gamma property selection pallet 210 may be displayed as another pallet separately from the image correction selection pallet 200.

With the example illustrated in FIG. 6, selection blocks 211 through 220 displayed as "Gamma 1" through "Gamma 10" within the basic gamma property selection pallet 210 are the selection blocks of basic gamma properties. Also, the basic gamma properties corresponding to the selection blocks 211 through 220 mutually differ. Note that FIG. 6 illustrates a case where the data of ten types of basic gamma properties is stored in the gamma property storage unit 50.

Also, a triangular display button 221 described within the selection blocks 211 through 220 indicates that each selection block further includes a block of a low-level selection menu. Further, a selection block 222 displayed as "OFF" within the basic gamma property selection pallet 210 is a block to be selected when halting implementation of gamma correction.

Note that, with the example illustrated in FIG. 6, an example is illustrated wherein the selection blocks corresponding to all of the basic gamma properties stored in the gamma property storage unit 50 are displayed on the basic gamma property selection pallet 210, but the present invention is not restricted to this. For example, only a part of the selection blocks may be displayed on the basic gamma property selection pallet 210 according to the type of the main image (e.g., color, monochrome, still image, or moving image), or the like. Also, the selection blocks to be displayed on the basic gamma property selection pallet 210 may be changed according to an external device connected to the image display device 100. In this case, the control unit 21 performs communication with an external device connected to the HDMI terminal of the digital input terminal unit 13 of the image input unit 1 using the CEC line of an HDMI cable to obtain the property of the external device thereof, and detailed information such as a device name. Subsequently, based on the obtained detailed information of the external device, the OSD unit 22 displays the selection block of the basic gamma property recommended by the external device to the basic gamma property selection pallet 210.

In the way described above, after the basic gamma property selection pallet 210 is displayed on the main image, the user uses the operating unit 5 to select a predetermined selection block within the basic gamma property selection pallet 210 (step S5). With the example illustrated in FIG. 6, a case is illustrated wherein the selection block 220 displayed as "Gamma 10" has been selected. In this case, such as illustrated in FIG. 6, the color of the selection block 220, and the color of characters within the block are inverted. Subsequently, the operating unit 5 outputs the operation signal corresponding to the operation thereof to the control unit 21 within the signal processing unit 2.

Next, the control unit 21 outputs a command signal to the effect that a black correction and/or white correction selection pallet is to be displayed based on the operation signal output from the operating unit 5, to the OSD unit 22. Subsequently, the OSD unit 22 displays a fine adjustment selection pallet for selecting whether or not correction of the gamma values of the black region and/or white region is performed as to the basic gamma property corresponding to "Gamma 10", on the main image (step S6).

Figure 7:
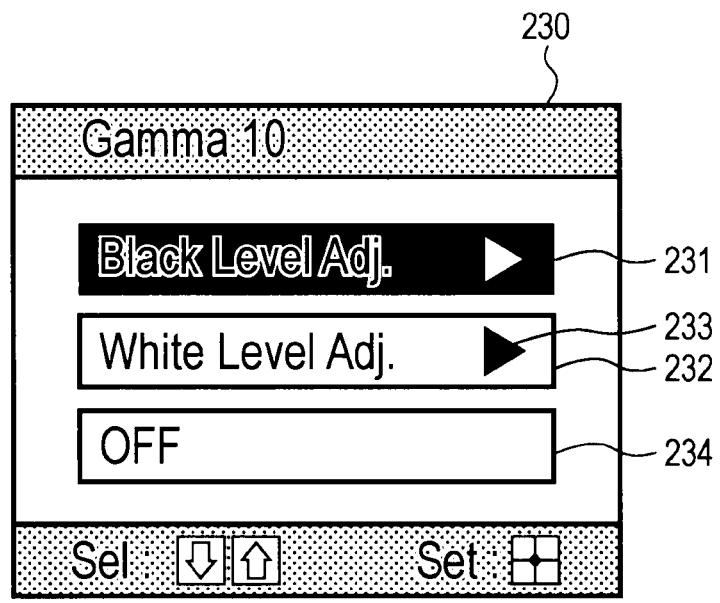
FIG. 7 is a display example of a fine adjustment selection pallet.

FIG. 7 illustrates a display example of the fine adjustment selection pallet to be displayed on the main image in step S6. The selection blocks corresponding to gamma value correction processing of the black region and the white region are listed on the fine adjustment selection pallet 230. Note that the fine adjustment selection pallet 230 may be displayed by redrawing the basic gamma property selection pallet 210 illustrated in FIG. 6, or the fine adjustment selection pallet 230 may be displayed from the basic gamma property selection pallet 210 in a pop-up manner. Further, the fine adjustment selection pallet 230 may be displayed as another pallet separately from the basic gamma property selection pallet 210.

With the example illustrated in FIG. 7, a selection block 231 displayed as "Black Level Adj." within the fine adjustment selection pallet 230 is a selection block corresponding to the gamma value correction processing of the black region. Also, a selection block 232 displayed as "White Level Adj." within the fine adjustment selection pallet 230 is a selection block corresponding to the gamma value correction processing of the white region.

Note that, with the example illustrated in FIG. 7, the selection block 231 displayed as "Black Level Adj." is displayed above the selection block 232 displayed as "White Level Adj.", but the present invention is not restricted to this. The selection block 231 displayed as "Black Level Adj." may be displayed below the selection block 232 displayed as "White Level Adj.".

However, displaying the selection block 231 of black correction above the selection block 232 of white correction obtains the following advantage. In general, of the black region and the white region, the black region provides high correction frequency to a user who employs the gamma value correction function. Therefore, with the present embodiment, let us consider a case where, when the fine adjustment selection pallet 230 illustrated in FIG. 7 is displayed, the selection block positioned in the most upper position is automatically set to become a selected state. In this case, the selection block 231 of the black region that is high in the user's correction frequency is automatically selected, simply by displaying the fine adjustment selection pallet 230. Therefore, in such a case, the user does not have to select the selection block 231 of the black region, and the user's operations are facilitated even further.

Note that a triangular display button 233 described in the selection blocks 231 and 232 indicates that each selection block has further a low-level selection menu, of which a palette exists. Also, a selection block 234 displayed as "OFF" within the fine adjustment selection pallet 230 is a block to be selected in the case that the gamma correction of the black region and/or white region is not performed.

In the way described above, after the fine adjustment selection pallet 230 is displayed on the main image, the user determines whether or not the gamma value correction processing (fine adjustment) of the black region and/or white region is performed (step S7).

Now, in the case that the user does not perform the gamma value correction processing of both of the black region and the white region (in the case of negative determination in step S7), the user uses the operating unit 5 to select the selection block 234 displayed as "OFF" within the fine adjustment selection pallet 230. In this case, the operating unit 5 outputs the operation signal corresponding to the operation thereof to the control unit 21 within the signal processing unit 2.

Next, the control unit 21 causes the basic gamma property selecting unit 51 within the gamma property generating unit 23 to operate based on the input operation signal. Subsequently, the basic gamma property selecting unit 51 reads out the data corresponding to the basic gamma correction property selected in the above step S5 from the gamma property storage unit 50, and outputs the data thereof to the gamma value superimposing unit 54 (step S8).

Next, the gamma value superimposing unit 54 takes the data of the input basic gamma property as the data of the final gamma property, and outputs the data of the gamma property thereof to the gamma correcting unit 31 within the panel output unit 3 (step S13).

On the other hand, in the case that the user performs the gamma value correction processing of the black region and/or white region (in the case of positive determination in step S7), the user uses the operating unit 5 to select one of the selection blocks 231 and 232 within the fine adjustment selection pallet 230 (step S9: second selection operation).

Now, let us consider a case where adjustment of the gamma value is performed only with the black region. In this case, such as illustrated in FIG. 7, the color of the selection block 231 of the black region, and the color of characters within the block are inverted. Subsequently, the operating unit 5 outputs the operation signal (second signal) corresponding to the operation thereof to the control unit 21 within the signal processing unit 2.

Next, the control unit 21 outputs a command signal to the effect that the black level adjustment pallet is to be displayed to the OSD unit 22 based on the operation signal output from the operating unit 5. Subsequently, the OSD unit 22 displays the black level adjustment pallet on the main image based on the input command signal (step S10).

Figure 8:
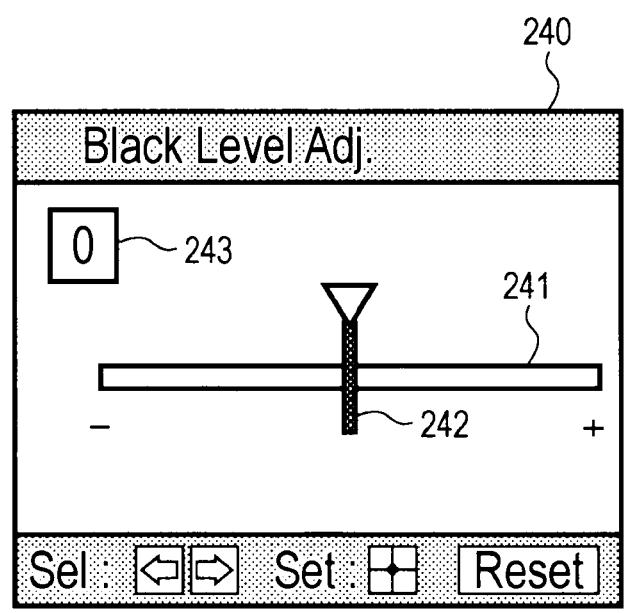
FIG. 8 is a display example of a black level adjustment pallet.

FIG. 8 illustrates a display example of the black level adjustment pallet to be displayed on the main image in step S10. With the example illustrated in FIG. 8, in order to allow the user to intuitively comprehend black level adjustment (increase/decrease), a gage expression type pallet is used as a black level adjustment pallet 240. With the black level adjustment pallet 240, the middle of a gauge 241 indicates a state in which the level adjustment is "0" (without correction). A region on the "+" side from the middle of the gauge 241 corresponds to an adjustment region where the gamma value of the black region is increased. Also, a region on the "−" side from the middle of the gauge 241 corresponds to an adjustment region where the gamma value of the black region is decreased.

Also, a mark 242 provided on the gauge 241 within the black level adjustment pallet 240 in FIG. 8 indicates a black level now being selected. "←" and "→" displayed in the field of "Sel" of the lower edge within the black level adjustment pallet 240 illustrated in FIG. 8 correspond to a selection key at the time of the black level being adjusted by the operating unit 5 in a stepwise manner.

The user presses the selection key ("←" and/or "→") of the operating unit 5, and thus, the mark 242 moves in the extending direction of the gauge 241. However, with the present embodiment, the adjustment of the gamma value of the black region is adjusted in a stepwise manner (±N steps, N: integer), and accordingly, the mark 242 moves in a stepwise manner. At this time, the adjustment level corresponding to the position of the mark 242 is displayed in a numeric block 243 within the black level adjustment pallet 240 illustrated in FIG. 8. Specifically, in the case that the black level is correctable in ±N steps, the numeric within the numeric block 243 changes in a range of −N through +N.

Also, "Reset" block of the lower edge within the black level adjustment pallet 240 illustrated in FIG. 8 corresponds to a reset button at the time of returning the adjustment level to "0" by the operating unit 5. Further, with the present embodiment, after the adjustment level of the gamma value of the black region is determined at the black level adjustment pallet 240, the fine adjustment selection pallet 230 illustrated in FIG. 7 is arranged to be redisplayed.

In the way described above, after the black level adjustment pallet 240 is displayed on the main image, the user uses the operating unit 5 to set the adjustment level of the gamma value of the black region (step S11).

Note that, in the case that adjustment of the gamma value is performed only with the white region, in the same way as with the above setting operation of the adjustment level of the gamma value of the black region, the adjustment level of the gamma value of the white region is set. However, with the present embodiment, let us say that the white level adjustment pallet is also configured in the same way as the black level adjustment pallet 240 in FIG. 8. Further, in the case that adjustment of the gamma value is performed as to both of the black region and the white region, after the adjustment level of the gamma value is set in one of the regions, the adjustment level of the gamma value is set in the other region.

Figure 9:
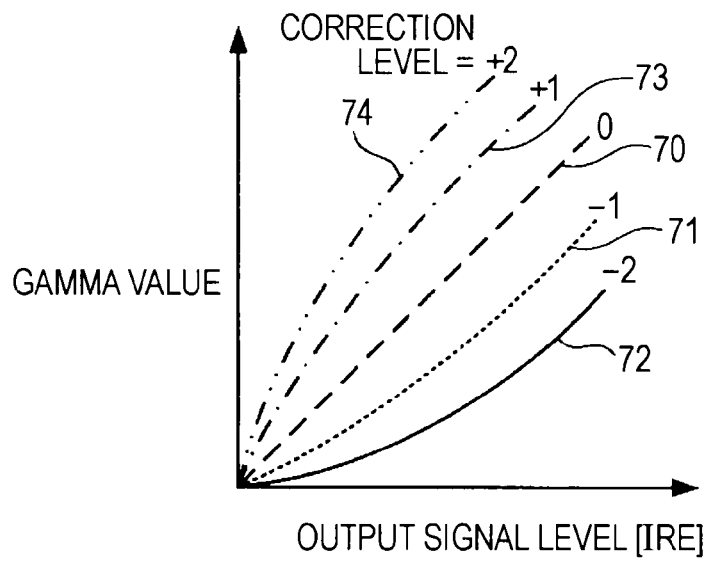
FIG. 9 is a diagram illustrating the outline of black level adjustment.

Now, FIG. 9 illustrates change in the correction gamma property of the black region (black correction property) in the case that the black level is adjusted in a stepwise manner by the black level adjustment pallet 240. Note that FIG. 9 illustrates a change example of the black correction property in the case that the level of the gamma value of the black region is corrected in ±2 steps. Also, the property 70 of a straight line illustrated in a dashed line in FIG. 9 is a basic gamma property.

In the case that the adjustment amount of the black level is set to, for example, "−1" using the black level adjustment pallet 240, with a black correction property 71 (dotted line in FIG. 9), the gamma value decreases as compared to the basic gamma property 70. Further, in the case that the adjustment amount of the black level is set to "−2" using the black level adjustment pallet 240, with a black correction property 72 (solid line in FIG. 9), the gamma value further decreases as compared to the correction gamma property 71 in the case that the adjustment amount of the black level is set to "−1".

On the other hand, in the case that the adjustment amount of the black level is set to, for example, "+1" using the black level adjustment pallet 240, with a black correction property 73 (dashed-dotted line in FIG. 9), the gamma value increases as compared to the basic gamma property 70. Further, in the case that the adjustment amount of the black level is set to "+2" using the black level adjustment pallet 240, with a black correction property 74 (dashed-two dotted line in FIG. 9), the gamma value further increases as compared to the correction gamma property 73 in the case that the adjustment amount of the black level is set to "+1".

In the way described above, in step S11, upon the user determining the adjustment level of the gamma value regarding the black region and/or white region, the operating unit 5 outputs the operation signal corresponding to the determination thereof to the control unit 21 within the signal processing unit 2.

Next, the control unit 21 causes the black correction property selecting unit 52 and/or the white correction property selecting unit 53 within the gamma property generating unit 23 to operate based on the input operation signal. Subsequently, the black correction property selecting unit 52 and/or the white correction property selecting unit 53 read out the data of the black correction property and/or the white correction property corresponding to the adjustment level of the gamma value regarding the black region and/or the white region set in the above step S11 from the gamma property storage unit 50, respectively. Subsequently, the black correction property selecting unit 52 and/or the white correction property selecting unit 53 output the data of the black correction property and/or the white correction property read out respectively to the gamma value superimposing unit 54 (step S12).

Also, in step S12, the control unit 21 causes the basic gamma property selecting unit 51 within the gamma property generating unit 23 to operate. Subsequently, the basic gamma property selecting unit 51 reads out the data corresponding to the basic gamma property selected in the above step S5 from the gamma property storage unit 50, and outputs the data thereof to the gamma value superimposing unit 54.

Subsequently, the gamma value superimposing unit 54 calculates the data of a desired gamma property based on the data of the input basic gamma property, and the data of the black correction property and/or white correction property, and outputs the data of the calculated gamma property to the gamma correcting unit 31 within the panel output unit 3 (step S13). Note that a method for calculating the data of a gamma property will be described in detail later.

With the present embodiment, based on the data of the plurality of basic gamma properties, the plurality of black correction properties and/or white correction properties, prepared beforehand in the way described above, the data of a desired gamma property is obtained.

Next, the gamma correcting unit 31 corrects the gamma value of the image signal 6 in accordance with the data of the input gamma property. Subsequently, the image projecting unit 4 projects the main image corresponding to the image signal 6 subjected to gamma correction on an external, e.g., screen or the like (step S14). With the present embodiment, the user repeats the above correction operation of gamma values while viewing the main image subjected to gamma correction to obtain a desired main image.

4. Calculation Method of Gamma Property Data

Figure 10:
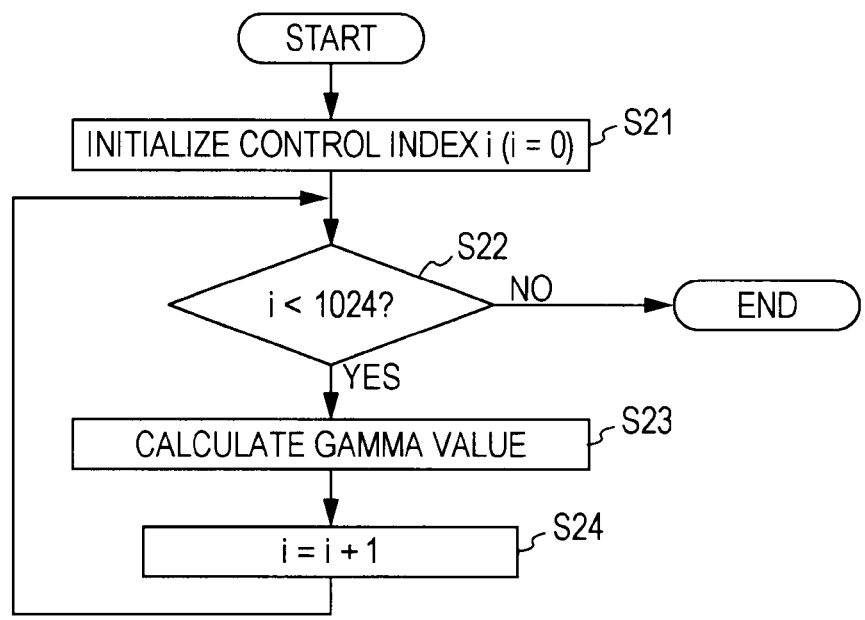
FIG. 10 is flowchart illustrating the procedures of gamma property calculation processing of an image display device according to an embodiment of the present invention.

Now, the calculation method of the data of a gamma property in the above step S13 will more specifically be described with reference to FIG. 10. FIG. 10 is a flowchart illustrating the procedures of the calculation method of the data of a gamma property. Now, description will be made regarding a case where the image signal 6 is 10-bit image data. That is to say, the number of density values (signal levels) of the image signal 6 becomes $2^{10}=1024$.

First, the control unit 21 initializes a control parameter i corresponding to the number of the signal levels of the image signal 6 (i=0) (step S21).

Next, the control unit 21 determines whether or not the control parameter i is less than 1024 (step S22). Now, in the case that the control parameter i is less than 1024, step S22 becomes positive determination.

In this case, the gamma value superimposing unit 54 corrects the gamma value of the signal level corresponding to the value of the control parameter i based on the data of the input basic gamma property, and the data of the black correction property and/or white correction property.

Specifically, for example, a gamma correction value Gamma(i) of the signal level corresponding to the value of the control parameter i may be obtained by $$\text{Gamma}(i) = \text{BGa}(i) + \text{BLA}(i) + \text{WLA}(i) - \text{Linear}(i)$$

Note that BGa(i) in the above expression is the gamma value of a basic gamma property of the signal level corresponding to the value of the control parameter i. Also, BLA(i) and WLA(i) are the gamma values of the black correction property and the white correction property of the signal level corresponding to the value of the control parameter i, respectively. Further, Linear(i) is the gamma value of a linear gamma property for calibration of the signal level corresponding to the value of the control parameter i.

Next, the control parameter i is updated (i=i+1) (step S23). Subsequently, the processing returns to step S22, where the above steps S22 through S24 are repeated until step S22 becomes negative determination, i.e., until gamma correction processing is completed regarding all of the signal levels.

Subsequently, in the case that the control parameter i becomes equal to or greater than 1024, step S22 becomes negative determination, and the gamma property calculation processing ends. With the present embodiment, thus, the correction value of a gamma value is calculated for each signal level (in a full range) as to the input image signal 6, and the data of a desired gamma property is calculated.

Note that, with the present embodiment, such as described above, an example has been described as a method for calculating a gamma property wherein the data of a basic gamma property, and the data of a black correction property and/or a white correction property are superimposed, but the present invention is not restricted to this. An arbitrary calculation method may be employed as long as a gamma property can be calculated by this method based on the data of a basic gamma property, and the data of a black correction property and/or a white correction property.

5. Calculation Example of Gamma Property

Next, a specific example of the gamma property calculated by the image display device 100 according to the above present embodiment (property example) will be described with reference to the drawings.

Figure 11:
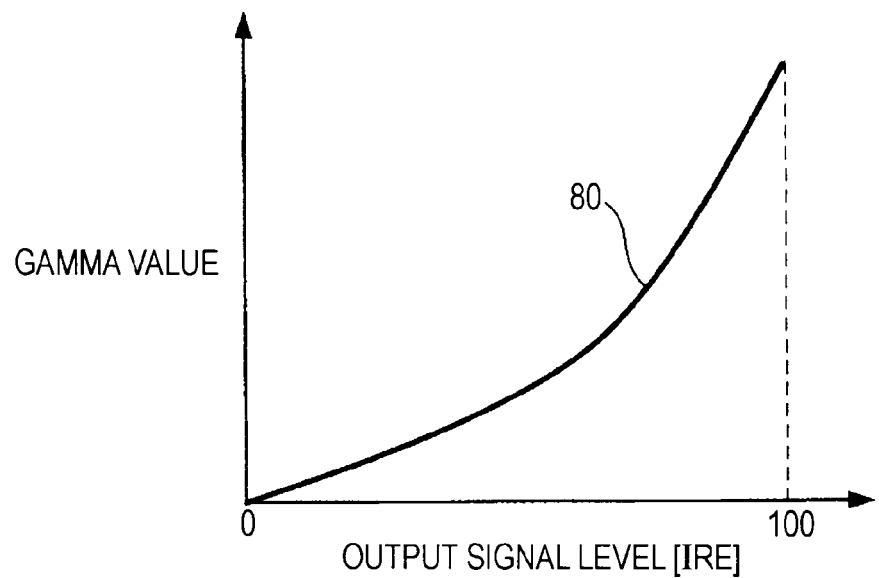
FIG. 11 is a diagram illustrating a property example of basic gamma property.

First, FIG. 11 illustrates the basic gamma property selected in this example. Note that the horizontal axis in FIG. 11 represents an output signal level, and the vertical axis represents a corrected gamma value. With this example, an example will be described wherein a gamma curve of the 2.2th power is selected as the basic gamma property 80.

Figure 12:
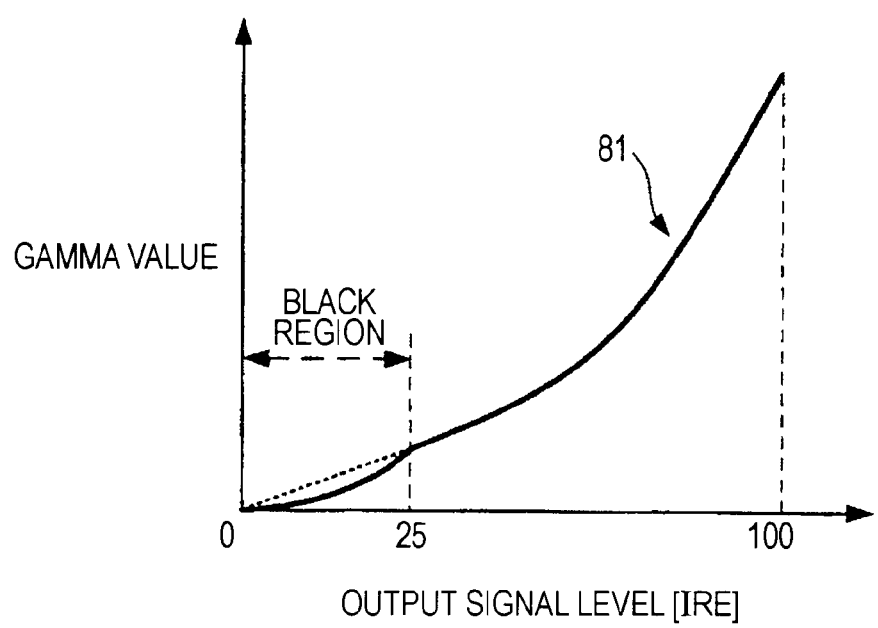
FIG. 12 is a first gamma property example calculated at an image display device according to an embodiment of the present invention.

FIG. 12 illustrates a gamma property (property example 1) in the case that only a black region (low-luminance region) is corrected as to the basic gamma property 80 illustrated in FIG. 11. Note that the property example 1 illustrates a gamma property 81 in the case that the adjustment level on the "−"

side at the above black level adjustment pallet 240 (FIG. 8) is selected. Also, with this example, the black region is set to a range of output signal levels 0 through 25 [IRE].

In this case, with the gamma property 81, the black region has a smaller gamma value than that of the basic gamma property 80 (dotted line), and regions other than this (25 through 100 [IRE]) have the same gamma property as the basic gamma property 80. In this case, a dark portion of a display image becomes a blackout image, and a sharp image of which the contrast is high is obtained. Note that, in the case that the adjustment level on the "+" side at the above black level adjustment pallet 240 (FIG. 8) is selected, with the black region, a gamma property is obtained wherein the gamma value is greater than that of the basic gamma property 80 (dotted line). In this case, an image that excels in the gradient of a dark portion can be displayed.

Figure 13:
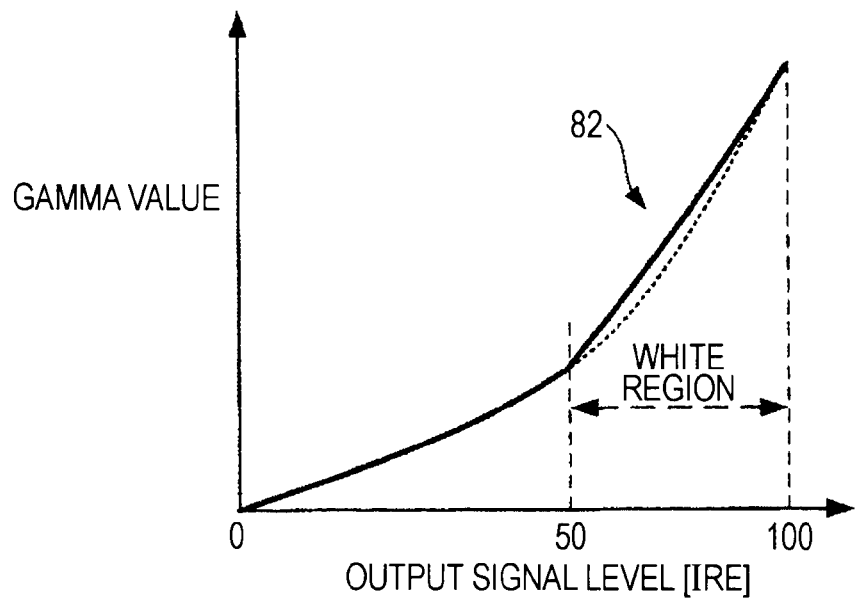
FIG. 13 is a second gamma property example calculated at an image display device according to an embodiment of the present invention.

FIG. 13 illustrates a gamma property (property example 2) in the case that only a white region (high-luminance region) is corrected as to the basic gamma property 80 illustrated in FIG. 11. Note that the property example 2 illustrates a gamma property 82 in the case that the adjustment level on the "+" side at the white level adjustment pallet (in the same configuration as the black level adjustment pallet illustrated in FIG. 8) is selected. Also, with this example, the white region is set to a range of output signal levels 50 through 100 [IRE].

In this case, with the gamma property 82, the white region has a greater gamma value than that of the basic gamma property 80 (dotted line), and regions other than this (0 through 50 [IRE]) have the same gamma property as the basic gamma property 80. In this case, a bright portion of a display image becomes a state called as "whiteout", and an image of which the contrast is high is obtained. Note that, in the case that the adjustment level on the "−" side at the white level adjustment pallet is selected, with the white region, a gamma property is obtained wherein the gamma value is smaller than that of the basic gamma property 80 (dotted line). In this case, an image that excels in the gradient of a bright portion can be displayed.

Figure 14:
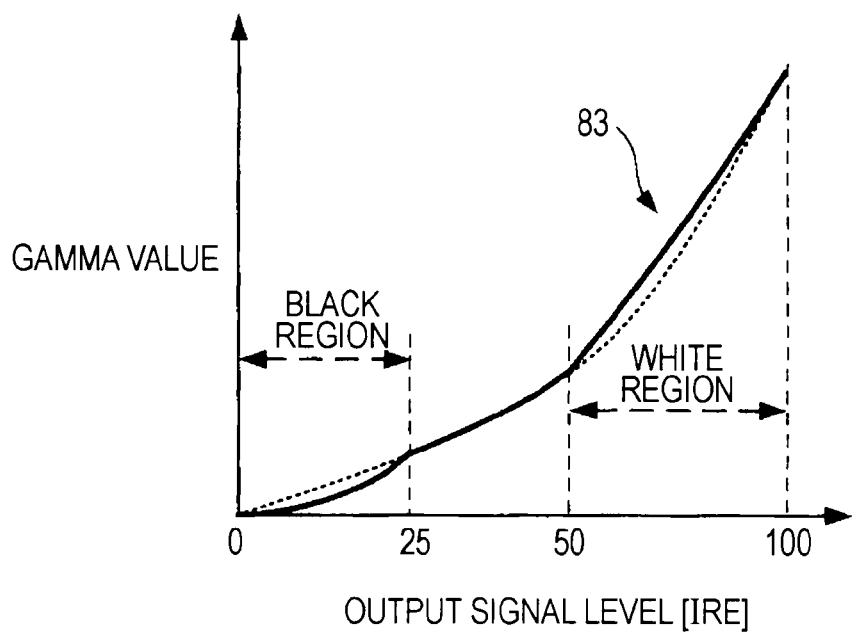
FIG. 14 is a third gamma property example calculated at an image display device according to an embodiment of the present invention.

FIG. 14 illustrates a gamma property (property example 3) in the case that both of a black region (low-luminance region) and a white region (high-luminance region) are corrected as to the basic gamma property 80 illustrated in FIG. 11. Note that the property example 3 illustrates a gamma property 83 in the case that the adjustment level on the "−" side at the black level adjustment pallet is selected, and the adjustment level on the "+" side at the white level adjustment pallet is selected. Also, with this example, the black region is set to a range of output signal levels 0 through 25 [IRE], and the white region is set to a range of output signal levels 50 through 100 [IRE].

In this case, with the gamma property 83, the black region has a smaller gamma value than that of the basic gamma property 80 (dotted line), and also the white region has a greater gamma value than that of the basic gamma property 80 (dotted line). Also, with the gamma property 83, regions other than those (25 through 50 [IRE]) have the same gamma property as the basic gamma property 80. In this case, a dark portion of a display image becomes a blackout state, and also a bright portion thereof becomes a "whiteout" state, and accordingly, an image having further higher contrast than those of the property examples 1 and 2 illustrated in FIGS. 12 and 13 is obtained.

Note that in the case that the adjustment level on the "+" side at the black level adjustment pallet is selected, and also the adjustment level on the "−" side at the white level adjustment pallet is selected, the gamma value of the black region is greater than that of the basic gamma property, and also the gamma value of the white region is smaller than that of the basic gamma property. In this case, the gradient increases in both of a dark portion and a bright portion, and accordingly, an image that further excels in the gradient can be displayed.

Such as described above, with the present embodiment, a desired gamma property can automatically be obtained simply by selecting a predetermined basic gamma property and correction gamma property from the plurality of the basic gamma properties stored beforehand in the gamma property storage unit 50, and a plurality of the correction gamma properties of a predetermined luminance region. Therefore, with the present embodiment, a gamma property according to the user's request can be readily obtained by more simple operations.

Also, with the present embodiment, when calculating a gamma property, a gamma property is calculated by superimposing a basic gamma property, and a correction gamma property of a predetermined luminance region (predetermined signal level range) in a full range. Therefore, the user's desired gamma correction can more accurately be reflected on a display image. That is to say, according to the present embodiment, the user can more simply and more accurately perform gamma correction according to his/her intent.

Note that, with the above embodiment, an example has been described wherein the present invention is applied to an image display device such as a projector, but the present invention is not restricted to this. The embodiments of the present invention may be applied to an arbitrary device as long as this device is an image processing device which subjects an output image to gamma correction, and the same advantage is obtained. For example, the embodiments of the present invention may be applied to an image processing device including no image projecting unit.

The present application contains subject matter related to that disclosed in Japanese Priority Patent Application JP 2009-193252 filed in the Japan Patent Office on Aug. 24, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image display device comprising:
    an image projecting unit configured to externally carry out enlargement projection of an image corresponding to a main image signal;
    a basic property selecting unit configured to select data of a predetermined basic gamma property from data of a plurality of predetermined basic gamma properties having a mutually different property across a whole range of a signal level range of said main image signal;
    a correction property selecting unit configured to select data of a predetermined correction gamma property from data of a plurality of predetermined correction gamma properties having a mutually different property in a partial range within the signal level range of said main image signal;
    a gamma property calculating unit configured to calculate data of a gamma property for each signal level of said main image signal based on the data of said predetermined basic gamma property selected at said basic property selecting unit, and the data of said predetermined correction gamma property selected at said correction property selecting unit;

a gamma correcting unit configured to subject said main image signal to gamma correction based on the data of said gamma property calculated at said gamma property calculating unit;

an operating unit configured to output a first signal corresponding to the selection operation of the data of said predetermined basic gamma property by a user, and a second signal corresponding to the selection operation of the data of said predetermined correction gamma property by a user; and a control unit configured to control each of the selection operation of the data of said predetermined basic gamma property at said basic property selecting unit, and the selection operation of the data of said predetermined correction gamma property at said correction property selecting unit, based on said first signal and said second signal output from said operating unit, wherein the gamma property calculation unit calculates the data of the gamma property by superimposing the data of the selected predetermined basic gamma property and the data of the selected predetermined correction gamma property.

2. The image display device according to claim 1, wherein said correction property selecting unit includes a first correction property selecting unit configured to select data of a predetermined first correction gamma property from data of a plurality of first correction gamma properties having a mutually different property in a signal level range from a signal level corresponding to 0 IRE to a predetermined first signal level, and a second correction property selecting unit configured to select data of a predetermined second correction property from data of a plurality of second correction gamma properties having a mutually different property in a signal level range from a second signal level that is greater than said first signal level to a signal level corresponding to 100 IRE.

3. The image display device according to claim 1, further comprising:

a storage unit in which the data of said plurality of predetermined basic gamma properties and the data of said plurality of predetermined correction gamma properties are stored.

4. The image display device according to claim 1, further comprising:

a gamma correction information display unit configured to generate a graphical user interface image configured to display selection candidate information of said predetermined basic gamma properties and/or said predetermined correction gamma properties based on a signal corresponding to said selection operation output from said operating unit, and to superimpose a sub image signal corresponding to this graphical user interface image on said main image signal.

5. An image display method comprising the steps of:

selecting data of a predetermined basic gamma property from data of a plurality of predetermined basic gamma properties having a mutually different property across a whole range of a signal level range of an image signal based on a signal corresponding to a user's first selection operation;

selecting data of a predetermined correction gamma property from data of a plurality of predetermined correction gamma properties having a mutually different property in a partial range within the signal level range of said image signal based on a signal corresponding to a user's second selection operation;

calculating data of a gamma property for each signal level of said image signal based on the data of said selected predetermined basic gamma property, and the data of said selected predetermined correction gamma property;

subjecting said image signal to gamma correction based on the data of said calculated gamma property; and externally carrying out enlargement projection of an image corresponding to said image signal subjected to said gamma correction, wherein the calculating the data of the gamma property includes superimposing the data of the selected predetermined basic gamma property and the data of the selected predetermined correction gamma property.

6. An image processing device comprising:

a basic property selecting unit configured to select data of a predetermined basic gamma property from data of a plurality of predetermined basic gamma properties having a mutually different property across a whole range of a signal level range of an image signal;

a correction property selecting unit configured to select data of a predetermined correction gamma property from data of a plurality of predetermined correction gamma properties having a mutually different property in a partial range within the signal level range of said image signal;

a gamma property calculating unit configured to calculate data of a gamma property for each signal level of said image signal based on the data of said predetermined basic gamma property selected at said basic property selecting unit, and the data of said predetermined correction gamma property selected by said correction property selecting unit;

a gamma correcting unit configured to subject said image signal to gamma correction based on the data of said gamma property calculated at said gamma property calculating unit;

an operating unit configured to output a first signal corresponding to the selection operation of the data of said predetermined basic gamma property by a user, and a second signal corresponding to the selection operation of the data of said predetermined correction gamma property by a user; and a control unit configured to control each of the selection operation of the data of said predetermined basic gamma property at said basic property selecting unit, and the selection operation of the data of said predetermined correction gamma property at said correction property selecting unit, based on said first signal and said second signal output from said operating unit, wherein the gamma property calculation unit calculates the data of the gamma property by superimposing the data of the selected predetermined basic gamma property and the data of the selected predetermined correction gamma property.

7. The image display device according to claim 2, wherein the plurality of predetermined first correction gamma properties are correction proprieties for a low-luminance region of the signal level range of the image signal.

8. The image display device according to claim 2, wherein the plurality of predetermined second correction gamma properties are correction proprieties for a high-luminance region of the signal level range of the image signal.

9. The image display device according to claim 2, wherein the plurality of predetermined first correction gamma properties are correction proprieties for a low-luminance region of the signal level range of the image signal, and the plurality of predetermined second correction gamma properties are correction proprieties for a high-luminance region of the signal level range of the image signal.

10. The image display device according to claim 2, wherein the predetermined first signal level is 25 IRE.

11. The image display device according to claim 2, wherein the predetermined second signal level is 75 IRE.

12. The image display device according to claim 2, wherein the data of the gamma property for each signal level is linear for values of the signal level range of the image signal between the predetermined first signal level and the predetermined second signal level.

13. The image display device according to claim 2, wherein the data of the gamma property for each signal level is non-linear for values of the signal level range of the image signal less than the predetermined first signal level and greater than the predetermined second signal level.

14. The image display device according to claim 12, wherein the data of the gamma property for each signal level is non-linear for values of the signal level range of the image signal less than the predetermined first signal level and greater than the predetermined second signal level.

15. The image display device according to claim 3, wherein the data of said plurality of predetermined basic gamma properties and the data of said plurality of predetermined correction gamma properties are stored in the storage unit prior to selection of the data of a predetermined basic gamma property and selection of the data of the predetermined correction gamma property.

16. The image display device according to claim 1, wherein the gamma property calculation unit calculates the data of the gamma property by superimposing the data of the selected predetermined basic gamma property and the data of the selected predetermined correction gamma property for each signal level of the image signal.

17. The image display device according to claim 2, wherein the gamma property calculation unit calculates the data of the gamma property by superimposing the data of the selected predetermined basic gamma property, the data of the selected predetermined first correction gamma property, and the data of the selected predetermined second correction gamma property.

18. The image display device according to claim 2, wherein the gamma property calculation unit calculates the data of the gamma property by superimposing the data of the selected predetermined basic gamma property, the data of the selected predetermined first correction gamma property, and the data of the selected predetermined second correction gamma property for each signal level of the image signal.

19. The image display device according to claim 2, wherein the predetermined first signal level is 25 IRE, and the predetermined second signal level is 75 IRE.

20. The image display device according to claim 15, wherein the storage unit includes at least one of a hard disk drive, semiconductor memory, and an optical disk.

* * * * *